United States Patent [19]

Asher

[11] Patent Number: 4,627,689

[45] Date of Patent: Dec. 9, 1986

[54] CRYSTALLINE COLLOIDAL NARROW BAND RADIATION FILTER

[75] Inventor: Sanford A. Asher, Pittsburgh, Pa.

[73] Assignee: University of Pittsburgh, Pittsburgh, Pa.

[21] Appl. No.: 559,437

[22] Filed: Dec. 8, 1983

[51] Int. Cl.⁴ .................... G02B 26/00; G02B 5/18
[52] U.S. Cl. .................... 350/362; 350/162.24; 350/162.17; 356/334
[58] Field of Search ............... 350/353, 355, 362, 374, 350/162.19, 162.2, 162.17, 162.23, 162.24, 359, 363, 162.11; 340/783; 356/326, 328, 331, 332, 333, 334

[56] References Cited

U.S. PATENT DOCUMENTS

| | | | |
|---|---|---|---|
| 4,078,856 | 3/1978 | Thompson et al. | 350/362 |
| 4,261,653 | 4/1981 | Goodrich | 350/362 |
| 4,453,805 | 6/1984 | Ashkin et al. | 350/162.2 |

Primary Examiner—John K. Corbin
Assistant Examiner—B. Steven Shapiro
Attorney, Agent, or Firm—Reed Smith Shaw & McClay

[57] ABSTRACT

A narrow wavelength band filtering device is provided by forming a highly ordered crystalline colloidal structure within a cell. The crystalline colloidal structure is relatively thin and has substantially planar and substantially parallel surface portions. The crystalline colloidal structure is formed by dispersing electrically charged particles, e.g., polystyrene spheres, within an appropriate solvent.

21 Claims, 5 Drawing Figures

CRYSTALLINE COLLOIDAL NARROW BAND RADIATION FILTER

ACKNOWLEDGEMENT

The invention described herein was made in part during the course of work under sponsorship by the Commonwealth of Pennsylvania acting through the Board of the Ben Franklin Partnership Fund and the MPC Corporation.

FIELD OF THE INVENTION

The present invention relates generally to filters which are used to select and/or reject predetermined frequencies of electromagnetic radiation.

The invention also relates to crystalline colloidal materials in which electrically charged particles form an ordered dispersion in a selected solvent.

DISCUSSION OF THE TECHNICAL PROBLEM

It is recognized in the literature that colloidal solutions of polystyrene spheres in various solvents can form crystalline structures having lattice spacing comparable to the wavelength of ultraviolet, visible and infrared radiation. Bragg diffraction techniques have been used to examine these polystyrene sphere crystals with a view toward identifying their interparticle spacing, lattice parameters and phase transitions. However, such studies were conducted for research purposes and generally yielded broad diffraction peaks with a relatively modest level of attenuation. Such results were useful for research purposes, but they failed to suggest any practical application for crystalline colloidal structures.

It is desirable in a variety of different endeavors to be able to filter out a narrow band of selected wavelengths from a broad spectrum of incident radiation, while permitting the transmission of the adjacent wavelengths. High spectral purity commercial monochromators which are available for this purpose generally use a plurality of gratings and prisms. However, such devices are extremely complex, bulky and expensive, e.g., with costs in excess of $20,000, and generally have the effect of attenuating a considerable portion of the adjacent wavelengths which are to be transmitted.

Another device producing a similar end result is marketed as a Raman Notch by Omega Optical, Inc. of Brattleboro, Vt. This device operates by passing a well-collimated beam of radiation to a first dielectric passband filter, where a percentage of the particular narrow wavelength band to be filtered is transmitted, while adjacent wavelengths are reflected. The reflected beam is directed to second, third and fourth dielectric passband filters, each "transmitting out" additional portions of the particular narrow wavelength band. Although useful in particular applications, the device is relatively complex, is not tunable to be operable for a range of different wavelengths, and the proper functioning of the device is restricted to use with well-collimated beams of radiation incident at precise angles to the device.

It would be advantageous to have a device which was able to selectively filter out wavelengths to a highly efficient degree, which did not attenuate desired wavelengths to a significant degree, which is tunable to filter a range of different wavelengths and which is simple, lightweight, and relatively inexpensive.

SUMMARY OF THE INVENTION

The present invention provides a simple and relatively inexpensive narrow band radiation filter which selectively and effectively filters a narrow band of wavelengths from a broader spectrum of incident radiation, while transmitting adjacent wavelengths to a high degree. For example, a filter can be produced in accordance with the present invention which filters out greater than 99.99% of a 40 Å wide wavelength band, while transmitting more than 90% of the intensity of remaining wavelengths.

The invention includes a crystalline colloidal structure which is formed with a pair of substantially planar and parallel outer surfaces. The crystalline colloidal structure includes a lattice spacing and a degree of order sufficient to Bragg diffract a narrow wavelength band with a high rejection ratio, e.g., greater than 99%. The crystalline colloidal structure is preferably formed of electrically charged polystyrene spheres in an appropriate solvent, and in one preferred embodiment, may be less than about one millimeter thick between the planar and parallel outer surfaces.

The filtering device of the present invention is tunable by adjusting the angle of incidence between the broad spectrum of radiation to be filtered and the planar and parallel faces of the crystalline colloidal structure. The filtering device is also tunable by creating a lattice spacing gradient in the crystalline colloidal structure and varying the sphere concentration.

DESCRIPTION OF PREFERRED EMBODIMENTS

Figure 1:
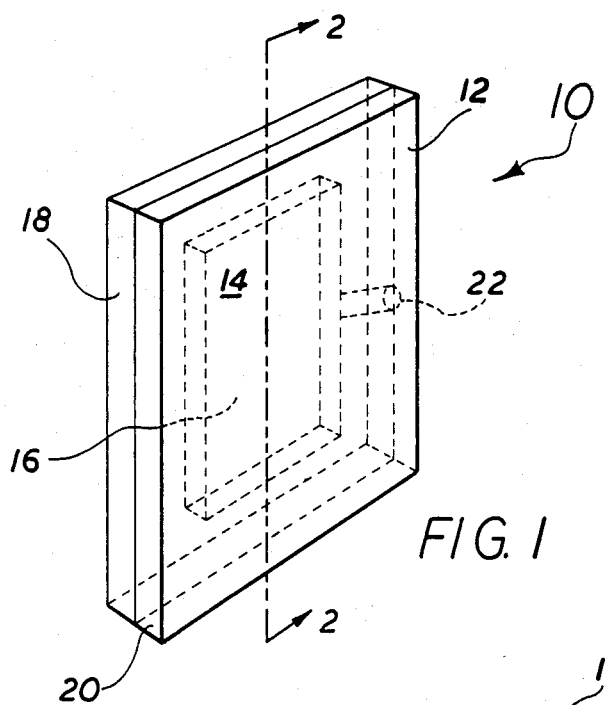
FIG. 1 is a perspective view of a narrow band filter incorporating features of the present invention.
Figure 2:
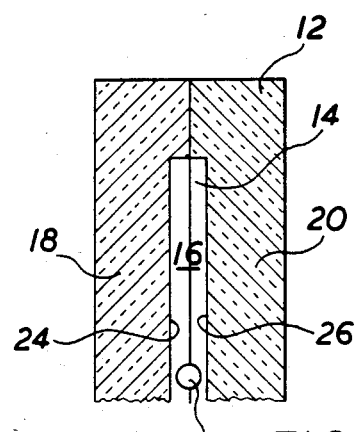
FIG. 2 is a view taken along lines 2—2 of FIG. 1.

With reference to FIGS. 1 and 2, there is shown a filtering device 10 illustrating features of the present invention. Filtering device 10 includes a cell 12 having a chamber 14 for containing a quantity of a crystalline colloidal structure 16 therein. As best shown in FIG. 2, cell 12 may be conveniently formed of a pair of members 18 and 20 which are secured together at least about their peripheral surfaces, one or both of members 18 and 20 having an inner recess area which forms chamber 14. An inlet port 22 may be conveniently provided for use in supplying the chamber 14 with the material which forms crystalline colloidal structure 16.

Although not limiting to the invention, in the embodiment shown in FIGS. 1 and 2 the chamber 14 includes opposite surfaces 24 and 26 which are substantially planar and substantially parallel to one another. Preferably, the opposite surfaces 24 and 26 are spaced apart a distance of between about 10 micrometers and about 1 millimeter. As will be discussed more fully below, the filtering characteristics of filtering device 10 may be varied by controlling the spacing between surfaces 24 and 26.

Although not limiting to the invention, it is preferred that cell 12 be formed of a material which does not have the effect of leeching ions from the material introduced therein, because the formation of crystalline colloidal structure 16 depends upon electrical interactions between the electrically charged particles which form its lattice structure. Quartz, plastic materials such as plexiglass, and coated glass have been successfully used to form cell 12.

Filtering device 10 is formed by introducing a prepared fluid into the chamber 14 of cell 12 through inlet port 22. The fluid introduced into chamber 14 forms a crystalline colloidal structure 16 under suitable temperature conditions to be described below. The lattice order and spacing of the crystalline colloidal structure 16 formed within chamber 14 serves to Bragg diffract selected wavelength bands of electromagnetic radiation incident thereon, and thereby effectively filters such wavelength bands from a broader spectrum of wavelengths in which they reside.

The fluid introduced into chamber 14 generally consists of a solvent which contains a quantity of a selected material which is capable of forming an ordered dispersion in the solution. Although not limiting to the invention, the solvent may be substantially aqueous, or it may be benzene, ethylene glycol, dioxane, methanol, acetonitrile, DMSO, benzyl alcohol or any similar material.

The selected material in the solvent is generally a quantity of electrically charged particles, preferably a quantity of polystyrene spheres, although the invention would not appear to be limited to the use of either spherical shapes or polystyrene. Any material capable of forming an ordered dispersion in the solvent could find application in the practice of the present invention.

The preferred polystyrene spheres useful in the practice of the invention are of a substantially homogeneous size and electrical charge, in order that the optimum degree of ordering can be realized in the resulting lattice. As will be discussed more fully below, the higher the ordering in the lattice structure, the narrower the wavelength band which may be filtered with filtering device 10.

Sphere diameters ranging from about 0.01 um. to about 1.0 um. may be used in the present invention, with diameter uniformity in a given sample preferably being maintained within 5% of the average. Samples of appropriate polystyrene spheres are available from Dow Diagnostics of Indianapolis, Ind.

PREPARATION OF THE CRYSTALLINE COLLOIDAL STRUCTURES

Polystyrene spheres having a sphere diameter indicated to be 0.109 um. with a standard deviation of 0.0027 um. may be commercially obtained from Dow Diagnostics. The spheres are cleaned of electrolyte and surfactant impurities by dialysis against a bath of doubly distilled water containing mixed bed ion exchange resin. After dialysis, the material may be stored as an approximately 10% by weight suspension over ion exchange resin obtainable from Bio-Rad as Analytical Grade AG501X8 mixed bed resin. The ion exchange resin should be cleaned prior to use through a procedure similar to that taught by Vanderhoff et al. in *J. Colloid Int. Sci.*, 1968, 28, 336–337.

The polystyrene sphere suspension is next diluted with deionized, doubly distilled water and placed within the cell 12. The cell 12 is sealed and placed in a room temperature water bath to allow the sample within to crystallize, preferably in a constant temperature and perturbation-free environment.

As the crystalline colloidal structure 16 forms in cell 12, geometric ordering of the crystalline structure apparently begins with respect to the surface 24 and 26 adjacent the surfaces 24 and 26 and extends therefrom into the central portions of the chamber 14. As an alternative to such surface initiation of the crystal formation process, it has been determined that formation can be initiated at a selected position within cell 12 by introducing a small quantity of ion exchange resin to the selected position, about which nucleation can begin. An increased degree of ordering may be realized through such a technique. Crystal formation is evidenced by a change in appearance of cell 12 from cloudy to irridescence.

After the crystalline colloidal structure 16 forms within cell 12, the cell 12 can be reasonably handled and transported without adversely affecting the integrity of the crystalline colloidal structure 16. While the crystalline colloidal structure 16 can be caused to "melt" into an amorphous structure if subjected to elevated temperatures, the lattice spacing of the crystalline colloidal structure 16 may also be affected by temperature increases short of those which will "melt" the crystalline structure. Likewise, the lattice spacing may also be altered (and controlled) by the imposition of an electric field upon the cell, because the lattice structure exists largely due to electrical repulsive forces between the polystyrene spheres. Because the wavelengths which are Bragg diffracted by the crystalline colloidal structure 16 are directly related to the lattice spacings thereof, the filter device 10 according to the present invention may be "tunable" for a specific wavelength band by controlling temperature and/or by controlling external electric fields operating on the filtering device 10. Further, at elevated levels, an external electric field could "melt" the crystalline colloidal structure into an amorphous structure which would not serve as a filtering device. In this manner, it is possible that the filtering device 10 of the present invention could be switched on and off, if desired.

It has also been determined that an electric field may be useful during the formation process of crystalline colloidal structure. For example, an a.c. voltage of less than about 100 volts has been applied perpendicular to the faces of cell 12 during formation of crystalline colloidal structure 16 to produce a more highly ordered crystalline structure which has greater stability and improved filtering characteristics. In addition, it has been determined that the addition of a small quantity of a detergent material, e.g., sodium dodecylsulfate, may improve the ordering of crystalline colloidal structure 16.

The concentration of the polystyrene spheres within the selected solvent material will have a direct impact upon the lattice spacing of any crystalline colloidal structure generated. For a given total volume of sample, as the polystyrene sphere concentration increases, the lattice spacing in the crystalline colloidal structure decreases. Although not limiting to the invention, a high degree of lattice ordering has been determined to be attainable with polystyrene sphere concentrations between about 0.9% and about 5%, and it is contemplated that similar ordering can be achieved with sphere concentrations between 0.01% and 10%.

The bandwidth of the narrow wavelength band which is Bragg diffracted by the present invention is believed to be a function of the degree of ordering of the polystyrene spheres within the crystalline colloidal structure 16, the diameter of the spheres, and the difference between the refractive indices of the spheres and the solvent. The narrowest bandwidth generally occurs in the most highly ordered system. In turn, the degree of ordering may be affected by the thickness of the sample, i.e., by the space between the inner surfaces of wall members 18 and 20. Samples which are too thin, e.g., less than about 50 um., may have too few sphere layers to minimize the width of the narrow wavelength band which is filtered. Likewise, in thick samples, e.g., greater than 2 millimeters, the sphere ordering may diminish and the width of the wavelength band which is Bragg diffracted correspondingly increase.

Bandwidth may also be affected by the refractive index of the solvent selected, and with relatively thick, highly ordered samples, e.g., 0.2 mm., it may be desirable to select a solvent having a refractive index close to the refractive index of the crystalline colloidal structure formed therein in order to minimize bandwidth. Bandwidths as small as about 1 Å may be attainable through use of such techniques.

EXAMPLE

The crystalline colloidal structure 16 described herein is exemplary of one useful in a filtering device 10 which Bragg diffracts a relatively narrow wavelength band with a high rejection ratio.

A dispersion of polystyrene spheres was prepared in the manner discussed above, and diluted with doubly distilled water to a concentration of about 3.0%.

The sample was sealed within a plexiglass cell 12 having chamber dimensions of about 40 mm.×40 mm.×0.4 mm. and a crystalline colloidal structure formed therein, as evidenced by a change from a cloudy appearance to an irridescent appearance.

The cell 12 was utilized as a narrow band wavelength rejection filter in a Raman spectroscopy apparatus and was determined to Bragg diffract about 99.99% of the light at the maximum of a 50 Å wide wavelength band centered at 4880 Å, while passing about 90% of the light at adjacent wavelengths.

The usefulness of the filtering device 10 as a narrow band filter was quite unexpected, inasmuch as it proved more effective than the highly complex and expensive monochromators which had been used for similar purposes prior to the present invention. While prior monochromators were capable of filtering out a similar percentage of a selected narrow band of wavelength, they commonly also filtered out large percentages of the remaining wavelengths.

OPERATION OF THE FILTER

Figure 3:
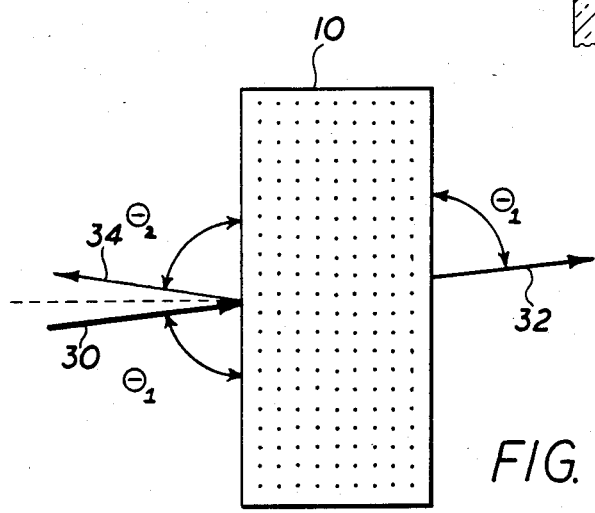
FIG. 3 is a schematic view illustrating the filtering function of the narrow band filter of the present invention.
Figure 4:
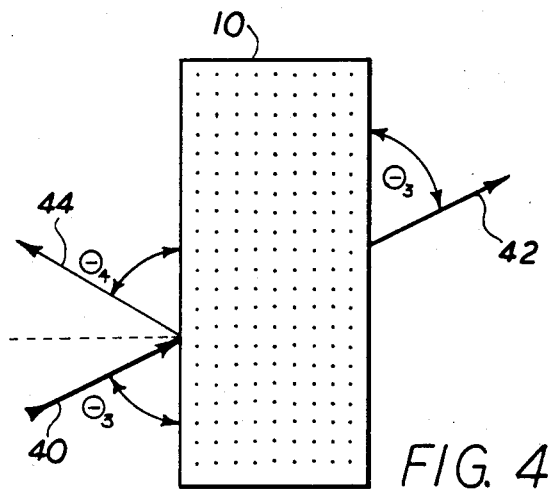
FIG. 4 is a schematic view similar to the view of FIG. 4, illustrating the filtering function at a different angle of incidence.
Figure 5:
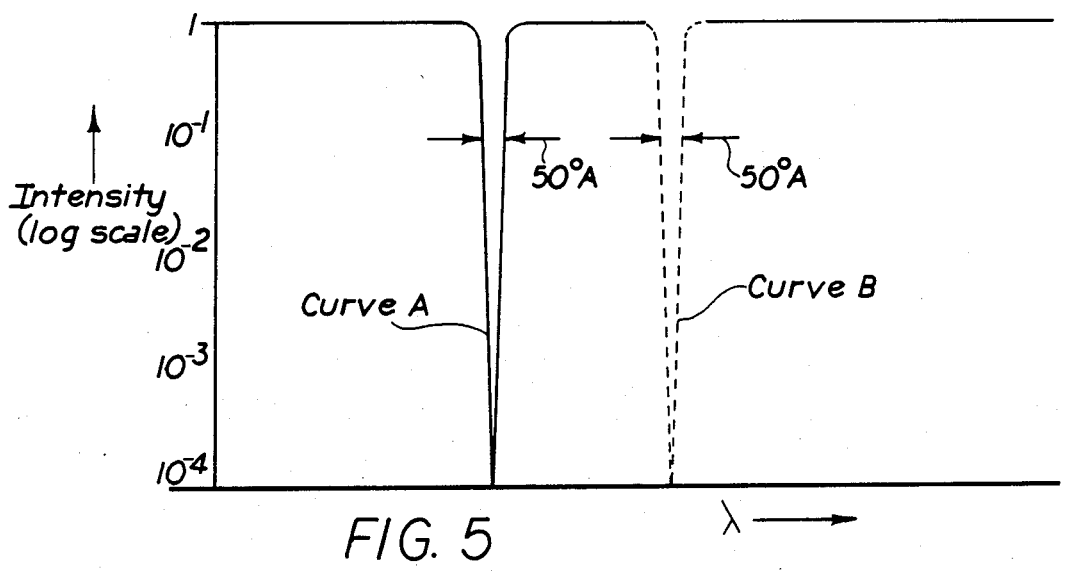
FIG. 5 is a spectrum indicating the narrow wavelength bands filtered in FIGS. 3 and 4.

With reference to FIGS. 3, 4 and 5, the operation of filtering device 10 as a function of the angle of incidence of the electromagnetic radiation is illustrated. In FIG. 3, a beam of electromagnetic radiation is incident upon filtering device 10 at an angle of $\theta_1$, a transmitted beam 32 departs the filtering device 10 at a substantially equal angle $\theta_1$, and a beam 34 of a narrow wavelength band is Bragg diffracted from the filtering device 10 at an angle $\theta_2$. In this manner, beam 34 is effectively filtered from beam 30, the wavelength of beam 34 satisfying the Bragg diffraction equation:

$$n\lambda = 2d \sin \theta_1$$

where d represents the lattice spacing within the crystalline colloidal structure 16 and n represents an integer.

Curve A of FIG. 5 illustrates that the wavelength band which is Bragg diffracted by the filtering device 10 according to the present invention may be quite narrow, e.g., 50 Å in width.

In FIG. 4, a beam 40 of electromagnetic radiation is incident upon filtering device 10 at an angle $\theta_3$, which is smaller than angle $\theta_1$ of FIG. 3. The transmitted beam 42 departs the filtering device 10 at an angle substantially equal to $\theta_3$, and a beam 44 of a narrow wavelength band is Bragg diffracted from the filtering device 10 at an angle $\theta_4$. With reference to Curve B of FIG. 5, the central wavelength of the narrow wavelength band filtered by filtering device 10 is dependent upon the incident angle, as determined by the Bragg difraction equation. Accordingly, it will be appreciated that the filtering device 10 of the present invention is "tunable" to filter a range of different wavelength bands, by controlling and appropriately adjusting the orientation between the filtering device 10 and the incident electromagnetic radiation. In this manner, a single filtering device 10 has been found to be useful over 2000 Å intervals, e.g., for wavelength bands centered from about 4000 Å to about 6000 Å.

Further, it has been determined that crystalline colloidal structures 16 may be formed which have a continuous range of lattice spacing, for example, from the top to the bottom of a cell 12. In this manner, different segments of the filtering device 10 can be used to Bragg diffract different wavelength bands from a beam of incident electromagnetic radiation, thereby further increasing the "tunable" characteristic of the filtering device 10 of the present invention. A concentration gradient and corresponding lattice spacing gradient may be formed by introducing an extra amount of solvent to one end of a uniformly spaced lattice structure, permitting the solvent to partially diffuse into the sample, and then "freezing" the nonuniform condition, e.g., by polymerization techniques. A range of lattice spacing differing by as much as 100% has been generated within a cell 12 in this manner.

Filtering devices in accordance with the present invention are known to be operable from the infrared region down to the near ultraviolet region, e.g., about 300 nm., depending upon the lattice spacing generated in a given filtering device 10.

However, the invention is not determined to be limited to such wavelength ranges, for crystalline colloidal structures having lattice spacings greater and less than those presently being explored are readily forseeable, by appropriate selection of different lattice-producing spheres and solvents.

With continued reference to FIGS. 3 and 4, it should be appreciated that while most of the discussion herein has been directed to the ability of the filtering device 10 to filter out a designated narrow wavelength band from a beam of electromagnetic radiation, the invention is also applicable to situations in which the "filtered" narrow wavelength band is to be preserved and utilized. For example, in laser communication or range-finding applications, it may be necessary to separate an information-containing laser frequency from all background illumination. The filtering device 10 according to the present invention can be utilized to "reflect" the desired laser wavelength band to a sheltered detection point while permitting the remainder of the wavelength spectrum to pass directly through the filter.

Additionally, it is within the scope of the present invention to form a filter device 10 having substantially parallel, non-planar outer surfaces in the crystalline colloidal structure, or alternatively, non-parallel planar outer surfaces therein. Thus, the present invention is not intended to be limited by the specific embodiments and applications described herein. Rather, reference must be made to the claims appended hereto.

What is claimed is:

1. A filtering device for separating a narrow wavelength band from a broader spectrum of electromagnetic radiation comprising
   a crystalline colloidal structure having a pair of substantially planar and parallel outer surfaces, said crystalline colloidal structure having a lattice structure which has a lattice spacing and a degree of order sufficient to Bragg diffract greater than about 90% of the intensity of a 200 Å wavelength band of the broader spectrum while passing greater than about 50% of the intensity of wavelengths adjacent to said wavelength band.

2. The filtering device as set forth in claim 1, wherein said outer surfaces are spaced less than 1 millimeter apart.

3. The filtering device as set forth in claim 1, wherein said outer surfaces are spaced less than 0.5 millimeter apart.

4. The filtering device as set forth in claim 1, wherein said outer surfaces are spaced less than 30 micrometers apart.

5. The filtering device as set forth in claim 1, further comprising
   cell means for containing said crystalline colloidal structure said cell means including substantially transparent wall members which are adjacent to the outer surfaces of said crystalline colloidal structure and being formed of material which is substantially non-leeching of adjacent ions.

6. The filtering device as set forth in claim 5, wherein said crystalline colloidal structure comprises a dispersion of electrically charged particles in a selected solvent.

7. The filtering device as set forth in claim 6, wherein said particles comprise polystyrene spheres having an average diameter less than 1.0 micrometers, and wherein said selected solvent is selected from the group consisting of aqueous solutions, benzene, ethylene glycol, methanol, acetonitrile, dioxane, benzyl alcohol and DMSO.

8. The filtering device as set forth in claim 7, wherein the concentration of said polystyrene spheres in said selected solvent is between about 0.01% and about 10%.

9. The filtering device as set forth in claim 8, further comprising
   means for adjusting the angle of incidence between said electromagnetic radiation and said outer surfaces of said crystalline colloidal structure to adjust the wavelengths included within said wavelength band.

10. The filtering device as set forth in claim 9, wherein the lattice spacing of said crystalline colloidal structure within said cell means varies along said outer surfaces such that different portions of said filtering device Bragg diffract different wavelength bands of said broader spectrum.

11. The filtering device as set forth in claim 1 wherein said wavelength band is less than 100 Å in width.

12. The filtering device as set forth in claim 1 wherein said wavelength band is less than 50 Å in width.

13. The filtering device as set forth in claim 1, wherein greater than about 99% of the intensity of said wavelength band is Bragg diffracted, while greater than about 80% of the intensity of wavelengths adjacent said narrow wavelength band are passed through said crystalline colloidal structure.

14. The filtering device as set forth in claim 1, wherein said wavelength band is less than 50 Å in width and wherein greater than about 99.99% of the intensity of said wavelength band is Bragg diffracted.

15. A method of filtering a narrow wavelength band from a broader spectrum of electromagnetic radiation, comprising the steps of
   forming a crystalline colloidal structure having a pair of substantially planar and parallel outer surfaces, said crystalline colloidal structure having a lattice structure which has a lattice spacing and a degree of order sufficient to Bragg diffract greater than about 90% of the intensity of a 200 Å wavelength band of the broader spectrum while passing greater than 50% of the intensity of wavelengths adjacent said wavelength band; and
   directing said broader spectrum of electromagnetic radiation onto one of said outer surfaces of said crystalline colloidal structure at an angle of incidence, whereby said wavelength band is Bragg diffracted out of said broader spectrum of electromagnetic radiation.

16. The method as set forth in claim 15, wherein said forming step comprises introducing a quantity of polystyrene spheres in a selected solvent into a cell means, said cell means including substantially transparent wall members which are substantially non-leeching of adjacent ions.

17. The method as set forth in claim 16, wherein said forming step comprises providing a concentration of said polystyrene spheres in said selected solvent between about 0.01% and about 10.0%.

18. The method as set forth in claim 17, wherein said forming step comprises selecting said selected solvent from the group consisting of aqueous solutions, benzene, ethylene gylcol, methanol, acetonitrile, dioxane, benzyl alcohol and DMSO.

19. The method as set forth in claim 18, wherein said forming step comprises applying an electric field upon said cell means after practicing said introducing step.

20. The method as set forth in claim 18, wherein said forming step comprises adding a quantity of detergent material into said selected solvent after practicing said introducing step.

21. The method as set forth in claim 15, further comprising the step of adjusting said angle of incidence of said broader spectrum of electromagnetic radiation to adjust the frequency of said wavelength band.

* * * * *